(12) United States Patent
Noro et al.

(10) Patent No.: US 6,795,631 B2
(45) Date of Patent: Sep. 21, 2004

(54) OPTICAL WAVEGUIDE APPARATUS AND METHOD OF PRODUCING THE SAME

(75) Inventors: Yoshihiko Noro, Yokohama (JP); Shiro Takahashi, Singapore (SG); Hisanori Suzuki, Singapore (SG); Satoshi Kobayashi, Kunitachi (JP)

(73) Assignee: Hoya Corporation, Tokyo (JP)

( * ) Notice: Subject to any disclaimer, the term of this patent is extended or adjusted under 35 U.S.C. 154(b) by 176 days.

(21) Appl. No.: 10/157,065

(22) Filed: May 30, 2002

(65) Prior Publication Data

US 2002/0181917 A1 Dec. 5, 2002

(30) Foreign Application Priority Data

May 31, 2001 (JP) ........................................ 2001-164812
May 21, 2002 (JP) ........................................ 2002-146157

(51) Int. Cl.[7] ........................ G02B 6/10; C03B 37/0224
(52) U.S. Cl. ........................ 385/132; 385/129; 385/386
(58) Field of Search ................................ 385/129–132; 65/386

(56) References Cited

U.S. PATENT DOCUMENTS

| | | | |
|---|---|---|---|
| 5,018,827 A | 5/1991 | Brownrigg et al. | |
| 5,377,285 A | 12/1994 | Podgorski | |
| 6,542,685 B1 * | 4/2003 | Yoneda | 385/130 |

FOREIGN PATENT DOCUMENTS

| | | |
|---|---|---|
| EP | 0 849 231 A1 | 6/1998 |
| JP | 8-320420 A | 12/1996 |
| JP | 2599786 | 9/1997 |
| JP | 2000-292632 A | 10/2000 |
| WO | WO 01/14916 A1 | 3/2001 |

OTHER PUBLICATIONS

European Search Report.
Yasuyuki Inoue, et al. (Athermal silica–based arrayed–waveguide grating (AWG) multiplexer) ECOC 97, Sep. 22–25, 1997, Conference Publication No. 448, 1997.

* cited by examiner

*Primary Examiner*—Brian Healy
*Assistant Examiner*—Kevin S. Wood
(74) *Attorney, Agent, or Firm*—Sughrue Mion, PLLC

(57) ABSTRACT

An optical waveguide apparatus comprises a substrate (1), a patterned waveguide as a core (4), and an upper cladding layer (10) formed on the substrate. The core is surrounded by a cladding comprising the substrate as a lower cladding layer and the upper cladding layer and smaller in refractive index than the core. The core and the cladding are integrally coupled to each other in a manner such that temperature-dependent expansion or contraction is performed substantially in accordance the characteristic of the cladding. The core and the cladding are made of materials selected so that the variation in optical path length according to the temperature-dependent expansion or contraction of the cladding is canceled by the variation in optical path length according to temperature-dependent variation in refractive index of the core.

5 Claims, 4 Drawing Sheets

OPTICAL WAVEGUIDE APPARATUS AND METHOD OF PRODUCING THE SAME

BACKGROUND OF THE INVENTION

This invention relates to an optical waveguide apparatus for use in a wavelength division multiplex (WDM) optical communication system as well as a method of producing the same. More specifically, this invention relates to a planar optical waveguide device for implementing a wavelength selecting function, such as an arrayed waveguide grating (AWG) used as an optical signal multiplexer or demultiplexer, as well as a method of producing the same.

In recent years, a wavelength division multiplex (WDM) transmission system becomes widely used in optical transmission. In the WDM transmission system, a number of signals different in wavelength from one another are multiplexed and transmitted through a single optical fiber. As a greater number of signals are multiplexed, a transmission capacity is increased. Most recently, 100 or more signals different in wavelength are multiplexed. As a consequence, a separation or spacing between different wavelengths is narrowed. For example, in a system of a 100 GHz grid, the spacing between two adjacent wavelengths must be equal to 0.8 nm. The WDM transmission system is initially used in a long-distance network but is growing wider applications covering a periphery of a terminal.

In the above-mentioned WDM transmission system, a device having a wavelength selecting function of selecting a particular signal among a number of signals different in wavelength is essential and indispensable. Such wavelength selecting function is provided by a planar optical waveguide device as an integrated device.

As an example of the planar optical waveguide device having such a wavelength selecting function, an arrayed waveguide grating (AWG) is disclosed in Japanese Patent No. 2599786 (JP 2599786 C). The arrayed waveguide grating is used as an optical multiplexer/demultiplexer. Referring to FIG. 1, a waveguide pattern of silica-based glass is formed on a substrate 1. The waveguide pattern includes at least one optical input waveguide 2, an input-side slab waveguide 3 as a first slab waveguide, a plurality of patterned or arrayed waveguides (channel waveguides) 4 different in length from one another, an output-side slab waveguide 5 as a second slab waveguide, and at least one optical output waveguide 6 (in the illustrated example, a plurality of optical output waveguides 6 are shown) which are successively connected in this order. A combination of the arrayed waveguides 4 forms a diffraction grating 14 so that the arrayed waveguide grating is provided. For simplicity of illustration, only a small number of waveguides are shown in FIG. 1. In an actual device, the arrayed waveguides are equal in number to about 100. The number of the optical output waveguides corresponds to the number of output channels.

The optical input waveguide 2 is connected to an optical fiber (not shown) so as to introduce a wavelength-multiplexed light beam. The light beam introduced through the optical input waveguide 2 into the input-side slab waveguide 3 is spread due to a diffracting effect of the input-side slab waveguide 3 to be incident to the respective arrayed waveguides 4 as split beams which propagate through the respective arrayed waveguides 4. The split beams propagating through the respective arrayed waveguides 4 reach the output-side slab waveguide 5. The split beams reaching the output-side slab waveguide 5 are condensed or focused as a focused beam which propagates into the optical output waveguides 6 to be outputted therefrom.

In the arrayed waveguide grating described above, the arrayed waveguides 4 are different in length from one another. Therefore, after the split beams delivered from the input-side slab waveguide 3 propagate through the respective arrayed waveguides 4, the split beams are shifted or differed in phase from one another. Depending upon the magnitude (quantity) of the phase shift or difference, the wavefront of the focused beam is tilted. A focusing position is determined by the tilting angle of the wavefront of the focused beam. Therefore, by forming the optical output waveguides 6 at that position, output light beams different in wavelength from one another can be produced from the optical output waveguides 6 corresponding to the different wavelengths, respectively.

In the arrayed waveguide grating, the diffraction grating 14 has a wavelength resolution proportional to a difference ($\Delta L$) in length between the arrayed waveguides 4 forming the diffraction grating 14. Therefore, by designing the diffraction grating 14 with a greater value of $\Delta L$, it is possible to carry out optical multiplexing and demultiplexing for multiple light beams at a narrower wavelength spacing.

However, in the above-mentioned arrayed waveguide grating, the patterned waveguides 4 are different in length from one another. This means that variations in length (optical path length) of the arrayed waveguides 4 in response to the variation in device temperature are different from one another. Therefore, in response to the variation in device temperature, filtered wavelengths, i.e., wavelengths demultiplexed by the arrayed waveguides 4 are greatly changed.

In order to solve the above-mentioned problem, it is proposed to introduce a temperature control mechanism into the optical multiplexer/demultiplexer. The temperature control mechanism comprises a Peltier device for cooling and a temperature control circuit and carries out temperature control of the arrayed waveguide grating so that the temperature variation itself is eliminated. However, introduction of such a temperature control mechanism results in an increase in size of the apparatus, an increase in cost, and an increase in power consumption.

As another approach without using the Peltier device, proposal is made of a method which will hereinafter be described in conjunction with FIG. 1. In order to cancel the temperature dependence of the arrayed waveguides 4 of the arrayed waveguide grating, a trapezoidal groove is formed across the arrayed waveguides 4, as depicted by a broken line in FIG. 1. The arrayed waveguides 4 comprise silica-based glass cores having a positive temperature coefficient of refractive index. A temperature compensating part 9 is formed by filling the trapezoidal groove with silicone resin having a negative temperature coefficient of refractive index.

By canceling the variation in optical path length due to the temperature-dependent variation in refractive index of each arrayed waveguide 4, it is possible to remove the temperature dependence of the arrayed waveguide grating (see "Athermal silica-based arrayed-waveguide grating (AWG) multiplexer", ECOC '97 Technical Digest, pp. 33–36, 1997). In this approach, the temperature dependence of the transmission wavelength of the arrayed waveguide grating is reduced to a small value equal to 0.001 nm/° C. or less.

However, with the above-mentioned structure, optical mismatch is caused between the arrayed waveguides and the temperature compensating part filled with silicone resin. Furthermore, it is difficult to form a cladding layer on the temperature compensating part 9 of a trapezoidal shape formed in the arrayed waveguide grating. This brings about occurrence of excessive loss in a region of the temperature compensating part 9 of a trapezoidal shape. As a consequence, the optical transmission loss characteristic of the arrayed waveguide grating as a whole device is degraded.

As a still another approach, EP 0849231 A1 discloses a method of improving the temperature characteristic by selecting a material of the waveguide. This method aims to improve the temperature characteristic of the device resulting from the difference in temperature dependence between the waveguides different in material. By exactly matching the optical path length temperature-dependent variation rate of two waveguides, the temperature characteristic of the wavelength control function is improved.

However, the above-mentioned method is not applicable to a device such that the waveguides are made of a same material and the wavelength control characteristic is achieved by the difference in physical length between the waveguides. Furthermore, even if the temperature characteristics of the individual waveguides are rendered identical by the use of the waveguides of the same material, a desired wavelength control characteristic can not be achieved unless the temperature characteristics of the individual waveguides are sufficiently low.

FIG. 2 shows a production process of a ridged optical waveguide widely used. In a first step, a core layer $4a$ is formed on the substrate 1. In a second step, the core layer $4a$ is patterned by a lithography or the like to form a plurality of cores 4. In a third step, an upper cladding layer 10 is formed to cover the cores 4. Thus, the cores 4 are surrounded by the upper cladding layer 10 and the substrate 1. Therefore, the substrate 1 may be called a lower cladding layer. A combination of the upper and the lower cladding layers may be collectively referred to as a cladding surrounding the cores 4.

Herein, glass thin films as the core layer $4a$ and the upper cladding layer 10 are formed by flame hydrolysis deposition. In case where the thin film is formed by the flame hydrolysis deposition, heat treatment is required after the thin film is formed. This is because a resultant deposit (called a soot) obtained by the flame hydrolysis deposition is low in density and must be increased in density in order to achieve excellent optical characteristics and low propagation loss. Therefore, in case where a planar waveguide device of a multilayer structure is formed by the above-mentioned thin film forming technique (flame hydrolysis deposition), a structure formed in a later step of the production process must have a glass transition point lower than that of a structure formed in an earlier step. Specifically, a glass of the upper cladding layer must have a glass transition point lower than those of a core glass and the substrate. As a consequence, the upper cladding layer 10 and the substrate 1 as the lower cladding layer are made of different glass materials. In this case, the upper and the lower cladding layers are different in coefficient of thermal expansion. This results in undesired stress applied to the core 4 as the optical waveguide.

As another production process, it is possible to form the upper cladding layer 10 by the use of chemical vapor deposition (CVD). In this case, the upper cladding layer 10 can be formed by the material same as that of the substrate 1 as the lower cladding layer. However, cracks or voids are locally formed between the upper cladding layer 10 and the cores 4. Thus, the upper cladding layer 10 and the cores 4 are not always kept in mechanical tight contact with each other.

After the thin film is formed, the heat treatment is required to remove the cracks or the voids formed in the upper cladding layer 10. In case where the heat treatment is carried out under such conditions that the cracks or the voids can be removed, not only the lower cladding layer formed by the same material is deformed but also the cores 4 typically lower in softening point are deformed. Therefore, it is difficult to achieve mechanical bond between the cladding and the core by the heat treatment.

As described above, the conventional arrayed waveguide gratings have various disadvantages. Furthermore, the existing methods of producing an optical waveguide apparatus such as the arrayed waveguide grating have several disadvantages also. These disadvantages are not restricted to the arrayed waveguide grating but apply to other typical optical waveguide apparatuses.

SUMMARY OF THE INVENTION

It is therefore an object of this invention to provide an optical waveguide apparatus which is practically free from temperature-dependent variation of an optical path length, low in optical transmission loss, small in size, and low in cost.

It is another object of this invention to provide a method of producing the optical waveguide apparatus mentioned above.

According to an aspect of this invention, there is provided an optical waveguide apparatus comprising a substrate, a core formed in a recessed portion of the substrate, and an upper cladding layer formed on the substrate, the core being surrounded by a cladding comprising the substrate as a lower cladding layer and the upper cladding layer and smaller in refractive index than the core;

the core and the cladding being integrally coupled to each other in a manner such that temperature-dependent expansion or contraction is performed substantially in accordance with the characteristic of the cladding;

the core and the cladding being made of materials selected so that the variation in optical path length of the core according to the temperature-dependent expansion or contraction of the cladding is canceled by the variation in optical path length according to temperature-dependent variation in refractive index of the core.

Preferably, each of the core and the cladding is made of silica-based glass. The core is made of a material having a negative temperature coefficient of refractive index.

Preferably, each of the substrate and the upper cladding layer is made of Ti-doped $SiO_2$ or F-doped $SiO_2$.

Preferably, the cladding is made of Ti-doped $SiO_2$ while the core to be combined therewith is made of a material selected from those having a smaller temperature coefficient of refractive index as compared with the case where the cladding is made of $SiO_2$.

Preferably, the cladding is made of F-doped $SiO_2$ while the core to be combined therewith is made of a material selected from those having a greater temperature coefficient of refractive index as compared with the case where the cladding is made of $SiO_2$.

Preferably, the core is made of a material containing $B_2O_3$.

Preferably, the core is made of a material selected from a $SiO_2$—$GeO_2$—$B_2O_3$ glass, a $SiO_2$—$TiO_2$—$B_2O_3$ glass, and a $SiO_2$—$GeO_2$—$B_2O_3$—$P_2O_5$ glass.

Preferably, the contents of $GeO_2$ and $B_2O_3$ have a ratio of 2:1 to 3:1.

Preferably, the cladding is made of a material selected from those having a refractive index lower than that of the material of the core;

the cladding material and the core material being combined so that the temperature coefficient of refractive index of the core material is different in sign from and equal in magnitude (absolute value) to the coefficient of thermal expansion of the cladding material.

According to another aspect of this invention, there is provided a method of producing an optical waveguide apparatus, comprising the steps of:

forming a recessed portion having a predetermined pattern on a surface of a substrate;

forming a core in the recessed portion of the substrate by the use of a material having a refractive index higher than that of the substrate, a temperature coefficient of refractive index which has a value reverse in plus/minus sign to a coefficient of thermal expansion of the substrate, and a glass transition point lower than that of the substrate; and heat-treating the substrate with the core formed in the recessed portion at a temperature higher than the glass transition point of the material of the core formed in the recessed portion of the substrate and lower than the glass transition point of the substrate.

Preferably, the predetermined pattern corresponds to an optical waveguide pattern forming an arrayed waveguide grating.

Preferably, the heat treating step is carried out at a temperature higher than the glass transition point of a core glass and lower than the glass transition point of $SiO_2$ as a cladding glass.

Preferably, the step of forming the core is followed by the step of forming an upper cladding layer to cover an upper surface of the substrate and an upper surface of the core formed in the recessed portion of the substrate;

the step of forming the upper cladding layer being followed by the step of heat-treating the substrate.

Preferably, the substrate and a glass plate to become the upper cladding layer are put into optical contact at normal temperature and then heat treated at a temperature higher than the glass transition point of the core material and lower than the glass transition point of the cladding material.

According to the above-mentioned aspects of this invention, it is possible to provide the optical waveguide apparatus capable of principally eliminating the temperature-dependent variation in optical path length. Specifically, the temperature-dependent variation of the optical path length of the optical waveguide apparatus is theoretically given by the following equation (1):

$$d(nL)/dT = nL\{1/n(dn/dT) + 1/L(dL/dT)\} \quad (1)$$

where n represents a refractive index of the optical waveguide, L, a physical length of the optical waveguide, T, a temperature. Considering that most of energy of a propagating light beam concentrates to the interior of the core, n is substantially represented by the refractive index of a core material. From the above-mentioned logic, the variation rate of the physical length L corresponds to the coefficient of thermal expansion of the core. If the core is mechanically constrained by the substrate as the lower cladding layer and the upper cladding layer, the coefficient of thermal expansion of the core is substantially represented by the coefficient of thermal expansion of a cladding material because the upper and the lower cladding layers have a volume much greater than that of the core.

From the equation (1), it is understood that the temperature-dependent variation in optical path length can be eliminated when the term $(1/n(dn/dT))$ corresponding to the temperature coefficient of refractive index of the core material is reverse in plus/minus sign and equal in value (absolute value) to the term $(1/L(dL/dT))$ corresponding to the coefficient of thermal expansion of the cladding material. Since the coefficient of thermal expansion of $SiO_2$ widely used as the cladding material, the temperature coefficient of refractive index of the core material must have a negative value.

In case where the above-mentioned condition is implemented, for example, by a planar optical waveguide, it is desired that a core is mechanically tightly constrained by the cladding comprising the upper and the lower cladding layers and surrounding the core. Therefore, in the above-mentioned aspects of this invention, it is preferable that the glass substrate as the lower cladding layer is provided with the recessed portion in which the core is buried and that the upper cladding layer is formed by the material same as that of the lower cladding layer. In order to perform the heat treatment to achieve the mechanical tight contact between the core and the cladding, it is essential that the glass transition point of the core material is sufficiently lower than that of the cladding. In the device of the above-mentioned structure, the shape of the core is retained by the cladding having a higher glass transition point. Therefore, after the core is formed, the shape of the core is not deformed by the heat treatment at a high temperature. Furthermore, during the heat treatment after the upper cladding layer is formed, the core is not deformed. Thus, it is possible to perform the heat treatment at a relatively high temperature to achieve the mechanical tight contact between the core and the cladding.

According to the above-mentioned aspects, it is possible to practically eliminate the temperature-dependent variation in optical path length without additionally using temperature stabilizing means, such as a Peltier device, or without inserting a material different in temperature coefficient of refractive index in the middle of an optical path. Thus, according to the above-mentioned aspects, it is possible to easily obtain an optical waveguide apparatus which is practically free from temperature-dependent variation in optical path length, small in optical transmission loss, small in size, and low in cost.

DESCRIPTION OF THE PREFERRED EMBODIMENT

Figure 1:
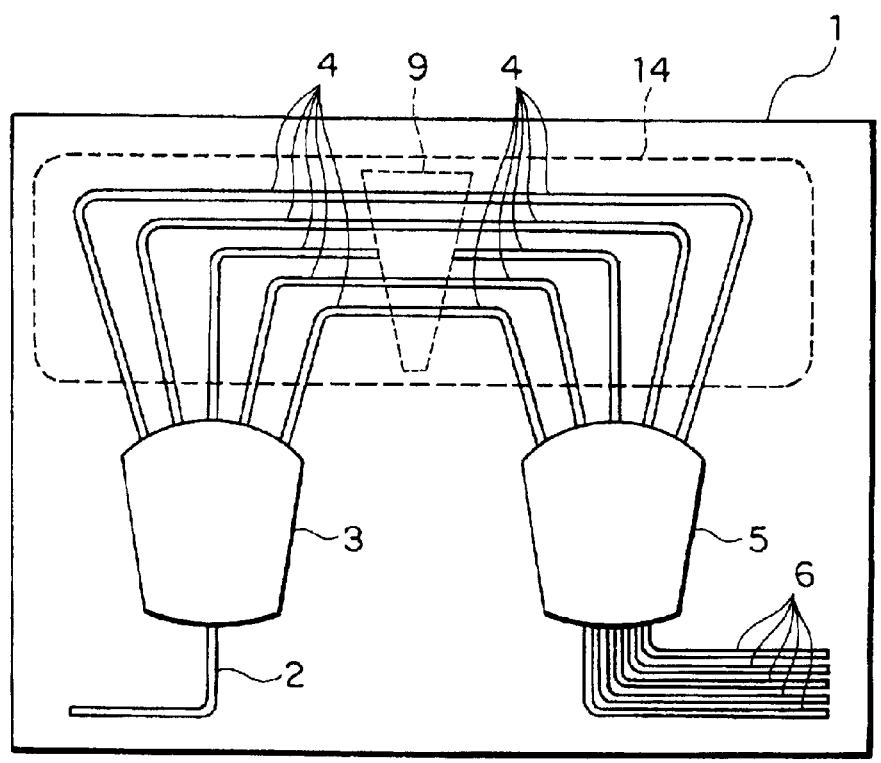
FIG. 1 is a view showing the structure of a conventional arrayed waveguide grating.
Figure 2:
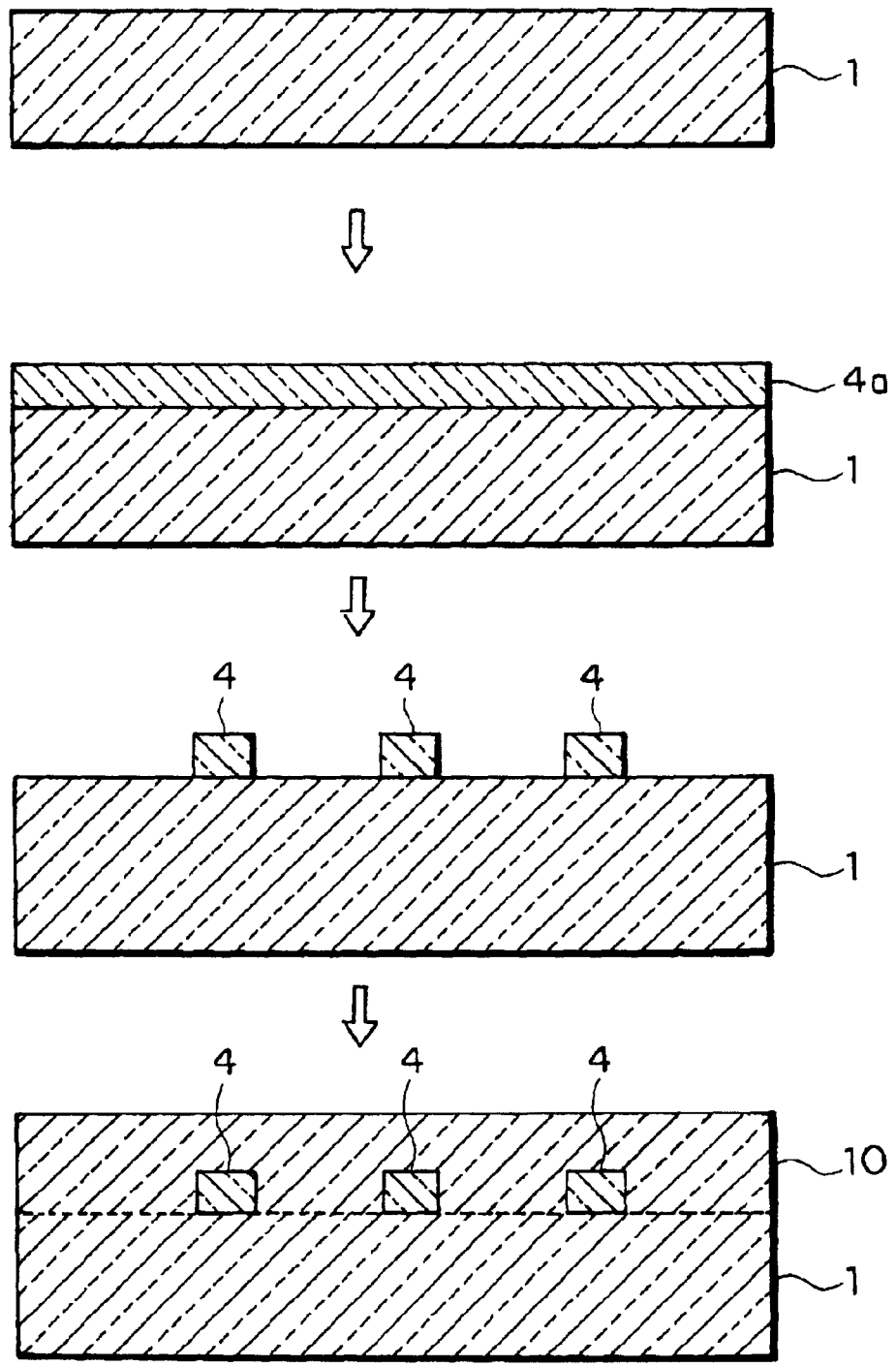
FIG. 2 is a view for describing a production process of a ridged optical waveguide widely used.

Now, description will be made of an arrayed waveguide grating and a method of producing the same according to an embodiment of this invention with reference to the drawing.

Figure 3A:
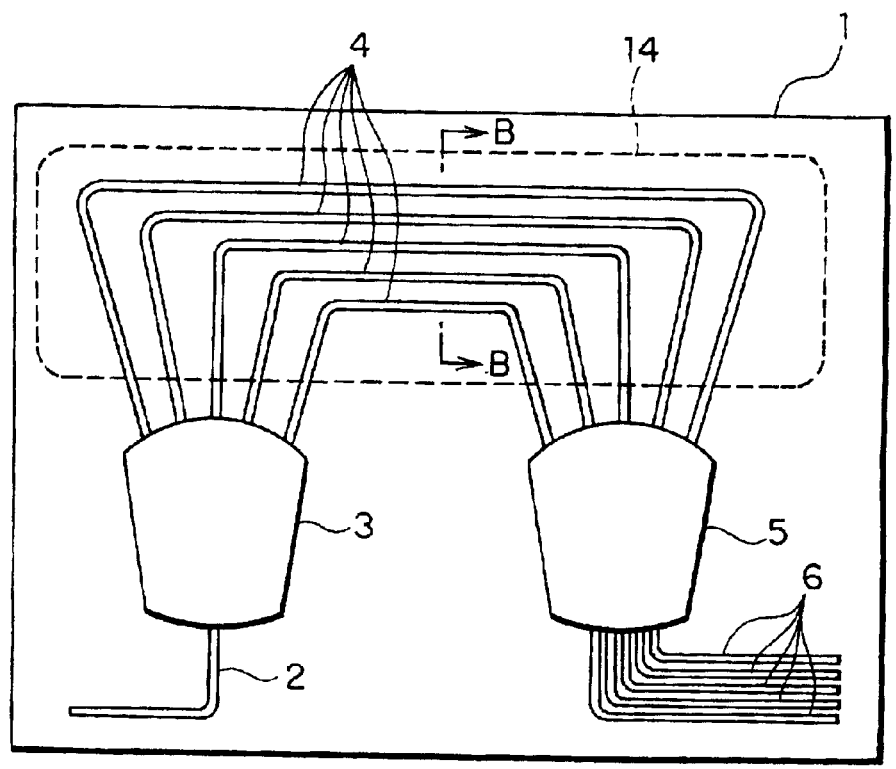
FIG. 3A is a view showing the structure of an arrayed waveguide grating as an optical waveguide apparatus according to an embodiment of this invention.

Referring to FIG. 3A, a substrate 1 is provided with at least one optical input waveguide 2, an input-side slab waveguide 3 as a first slab waveguide, a plurality of arrayed waveguides (channel waveguides) 4 different in length from one another, an output-side slab waveguide 5 as a second slab waveguide, and at least one (typically, a plurality of) optical output waveguide 6 which are successively connected in this order. In the illustrated example, a plurality of the optical output waveguides 6 are shown.

A combination of the arrayed waveguides 4 forms a diffraction grating 14. For simplicity of illustration, only a small number of the waveguides are shown in FIG. 3A. In an actual device, the number of the arrayed waveguides 4 is equal to, for example, 93 and the number of the optical output waveguides 6 is equal to, for example, 8 corresponding to the number of output channels. Generally, it is sufficient that the number of the optical input waveguide 2 is equal to one. If a plurality of the optical input waveguides 2, equal in number to the optical output waveguides 6 are provided, a waveguide structure is symmetrical so that it is used from either side.

Figure 3B:
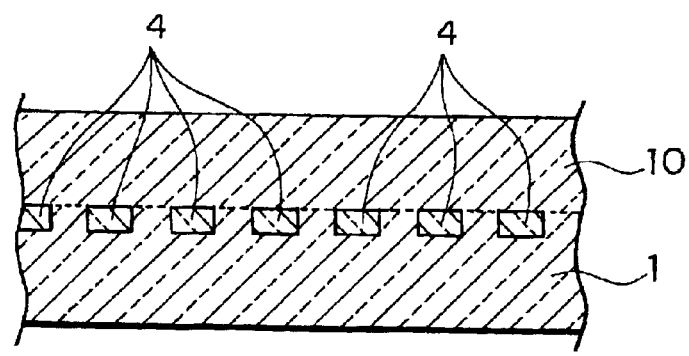
FIG. 3B is a sectional view taken along a line B—B in FIG. 3A.

Referring to FIG. 3B, each of the arrayed waveguides 4 comprises a core material filled in a groove formed in the substrate 1 as a lower cladding layer. An upper cladding layer 10 same in material to the substrate 1 is integrally formed with the core material. Thus, a structure in which the core is surrounded by a cladding comprising the substrate 1 as the lower cladding layer and the upper cladding layer 10 is obtained. In the illustrated example, the upper cladding layer 10 has a thickness of 1 mm and the arrayed waveguide 4 has a dimension of 7 $\mu$m×7 $\mu$m in section. A space between two adjacent ones of the arrayed waveguides has a width equal to 4 $\mu$m at a narrowest position. Each of the substrate 1 as the lower cladding layer and the upper cladding layer 10 is formed by $SiO_2$. The arrayed waveguide 4 as the core is formed by $SiO_2$—$GeO_2$—$B_2O_3$ glass ($GeO_2$: 13 mol %, $B_2O_3$: 6 mol %, $SiO_2$: 81 mol %)).

Each of the optical input waveguide 2, the optical output waveguides 6, the input-side slab waveguide 3, and the output-side slab waveguide 5 is formed by a glass material same as that of the arrayed waveguide 4. The glass material of the above-mentioned composition has a negative temperature coefficient of refractive index such that the variation in optical path length of the core due to the temperature-dependent variation of $SiO_2$ geometric size is substantially canceled. Specifically, the temperature coefficient of refractive index of a core glass material is different in plus/minus sign from the coefficient of thermal expansion of $SiO_2$. In the equation (1), the term $(1/n(dn/dT))$ corresponding to the temperature coefficient of refractive index of the core glass material has a value (absolute value) substantially equal to a value (absolute value) of the term $(1/L(dL/dT))$ corresponding to the coefficient of thermal expansion of $SiO_2$. It is noted here that the glass transition point of $SiO_2$, i.e., the glass transition point of the cladding material is equal to about 1190° C. On the other hand, the core glass material has a glass transition point of about 1050° C. which is lower than the glass transition point of $SiO_2$.

Selection of the core material and the cladding material will be considered. By way of example, description will be made of the case where each of the core material and the cladding material is glass. At first, as will later be described, the core forming the arrayed waveguide 4 must be uniformly and entirely kept in tight contact with and constrained by the substrate 1 forming the lower layer and the upper cladding layer 10. For this purpose, the heat treatment is carried out after the core is formed in the recessed portion to form the arrayed waveguide 4. The heat treatment must be performed at a temperature not lower than the glass transition point of the core glass material so as to achieve the above-mentioned constrained state. Therefore, the glass transition point of the cladding material must be equal to or higher than the glass transition point of the core glass material.

Next, a combination of the cladding glass material and the core glass material is selected so that, in addition to the relationship between the glass transition points, the core glass material has a predetermined refractive index and a predetermined temperature coefficient of refractive index while the cladding glass material satisfies a predetermined coefficient of thermal expansion. At first, depending upon the shape of the optical waveguide, the refractive index required to the core material is determined. Generally, as the optical waveguide is smaller in size, the core material is required to have a higher refractive index. Next, in order that the light beam is confined in the optical waveguide and propagates therethrough, the cladding material is selected from those materials lower in refractive index than the core material. At this time, the combination is selected so that, in the equation (1), the term $(1/n(dn/dT))$ corresponding to the temperature coefficient of refractive index of the core glass material is reverse in plus/minus sign and equal in value (absolute value) to the term $(1/L(dL/dT))$ corresponding to the coefficient of thermal expansion of the cladding glass material.

Hereinafter, specific examples of the cladding glass material and the core glass material will be mentioned. As the material of each of the substrate 1 and the upper cladding layer 10, use may be made of Ti-doped $SiO_2$ and F-doped $SiO_2$ in addition to $SiO_2$. By doping Ti into $SiO_2$, the refractive index of the glass is increased and the coefficient of thermal expansion is decreased. Therefore, in case where Ti-doped $SiO_2$ is used as the cladding material, the core material to be combined therewith is selected from those materials having a small temperature coefficient of refractive index as compared with the case where $SiO_2$ is used as the cladding material. Furthermore, the core material must have a relatively high refractive index.

On the other hand, in case where F is doped into $SiO_2$, the refractive index of the glass is decreased and the coefficient of thermal expansion is increased. In this case, the core material to be combined is selected from those materials having a large temperature coefficient of refractive index as compared with the case where $SiO_2$ is used as the cladding material, contrary to the above-mentioned case. The tolerance or allowance of the refractive index is widened. As described above, the cladding material satisfying the desired characteristics must be appropriately selected so that the right side of the above equation (1) is equal to 0, considering the refractive index of the core material, the temperature coefficient of refractive index, and the coefficient of thermal expansion of the cladding material.

As an example of the core material of the arrayed waveguide 4 as the core, use may be made of $SiO_2$—$GeO_2$—$B_2O_3$ glass, $SiO_2$—$TiO_2$—$B_2O_3$ glass, and $SiO_2$—$GeO_2$—$B_2O_3$—$P_2O_5$ glass. Among components of these glasses, $GeO_2$ and $TiO_2$ increase the refractive index of the glass while $B_2O_3$ and $P_2O_5$ decrease the temperature coefficient of refractive index of the glass.

Generally, as the content of $B_2O_3$ is increased, weather resistance of the glass is degraded. However, if $B_2O_3$ and $P_2O_5$ are added together, the effect of improving the stability is obtained. By way of example, consideration will be made of the $SiO_2$—$GeO_2$—$B_2O_3$ glass. By addition of $GeO_2$, the refractive index of the glass is increased but, simultaneously, the temperature coefficient of refractive index is increased. Therefore, in order to obtain a desired temperature coefficient of refractive index, the content of $B_2O_3$ must be increased as the content of $GeO_2$ is increased. In view of the above, the ratio of $GeO_2$ and $B_2O_3$ is preferably between 2:1 and 3:1.

Figure 4:
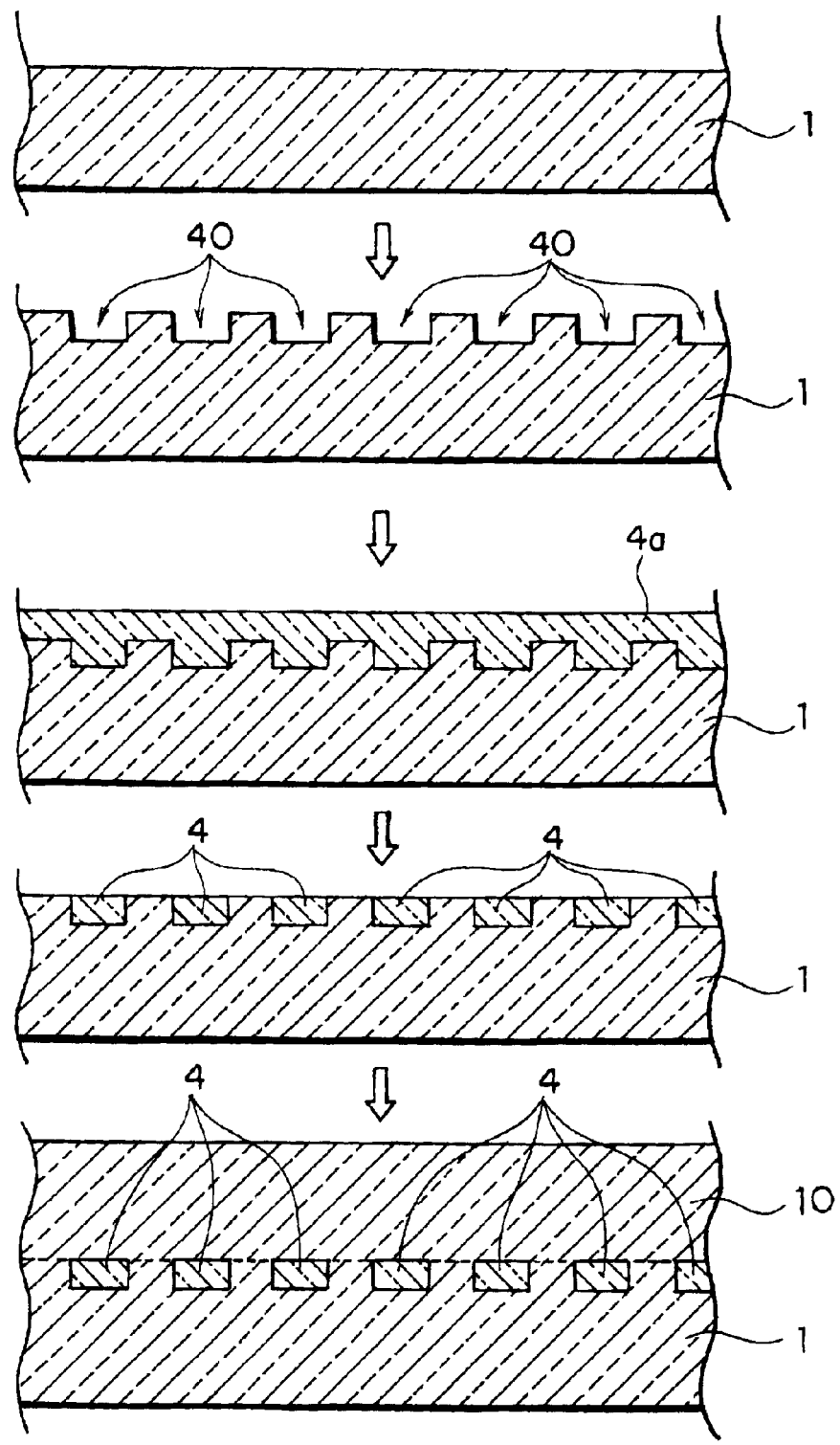
FIG. 4 is a view for describing a production process of the arrayed waveguide grating as a production process of the optical waveguide apparatus according to an embodiment of this invention.

Referring to FIG. 4, description will be made of a method of producing the arrayed waveguide grating having the above-mentioned structure. On the synthetic silica-based glass ($SiO_2$) substrate 1 having a thickness of 1 mm and a diameter of 3 inches, a recessed groove 40 corresponding to the optical waveguide pattern forming the arrayed waveguide grating is formed. The recessed groove 40 corresponding to the arrayed waveguide 4 has a width of 7 $\mu$m and a depth of 7 $\mu$m. The portion having a smallest space (width of a portion between two adjacent ones of the arrayed waveguides) is formed in the vicinity of a joint portion between the arrayed waveguides 4 and the slab waveguide 5 and is equal to 4 $\mu$m.

The recessed groove 40 is formed by the use of photolithography widely used in LSI production or the like. Etching is carried out by reactive ion etching using Freon 23 ($CHF_3$) (hereinafter simply referred to as Freon). In order to form the recessed groove having an exact square section, an induction coupling plasma (hereinafter abbreviated to ICP) apparatus (manufactured by Samco) is used as a reactive ion etching apparatus. A Freon gas of about 5 mTorr is introduced as a reactive gas. High-frequency power is applied under the condition of a frequency of 13.56 MHz and a power of 103W. A Cr thin film formed by sputtering and having a thickness of 100 nm is used as a mask.

Next, the Cr mask left on the substrate 1 is removed by the use of cerium ammonium nitrate $((NH_4)_2Ce(NO_3)_6)$. Thereafter, a glass thin film 4a to serve as the core is formed on the substrate 1. As the core, an amorphous hydrogenated silicon dioxide (a-$SiO_2$:H) film with germanium (Ge) and boron (B) added thereto is deposited by plasma enhanced chemical vapor deposition (hereinafter abbreviated to PECVD). Material gases are tetraethoxy silane ($Si(OC_2H_5)_4$: hereinafter abbreviated to TEOS), tetramethoxy germane ($Ge(OCH_3)_4$: hereinafter abbreviated to TMOG), triethoxy borane ($B(OC_2H_5)_3$), and oxygen ($O_2$).

In the above-mentioned material, triethoxy boron may be replaced by trimethoxy boron ($B(OCH_3)_3$). By changing the material gas, the doping amount contained in the deposited film is varied. In the above-mentioned deposition, the desired composition is obtained by optimizing the depositing condition such as a gas pressure. In this case, the gas pressure in a vacuum chamber during deposition is equal to 5.0 Pa. The high-frequency power supplied to an ICP reactor and a substrate electrode is equal to 900W and 300W, respectively. A VDC at the substrate electrode arranged on the surface of the substrate is equal to −400V. The substrate temperature is 250° C. By controlling the flow rate of the material gas, the thin film 4a comprising 12.5 mol % germanium oxide, 6.2 mol % boron oxide ($B_2O_3$), and 81.3 mol % silicon oxide is obtained. The deposition time is 120 minutes and the deposition thickness is 7 $\mu$m.

It is widely known that cracks or voids are locally observed in the glass formed in the recessed groove 40 and the glass is not entirely kept in tight contact with the substrate 1 as the lower cladding layer. In order to avoid the above-mentioned problem as far as possible, the thin film is formed by the use of plasma enhanced chemical vapor deposition in this embodiment. In order to achieve the state where the core is uniformly and entirely constrained by the lower cladding layer formed by the substrate 1, heat treatment is carried out. The heat treating condition is 1100° C. and 30 minutes in this embodiment. The above-mentioned temperature is higher than the glass transition point of the core glass and lower than the grass transition point of $SiO_2$ as the cladding glass. The heat treatment is also effective in suppressing the fluctuation of the refractive index and in removing hydrogen during deposition of the thin film.

In this embodiment, an unnecessary part of the thin film attached to an area except the groove is removed by polishing to leave the core so that the arrayed waveguide 4 is formed. To the substrate 1 with an optically flat surface achieved by polishing, a silica ($SiO_2$) glass plate having a thickness of 1 mm is bonded as the upper cladding layer 10. The bonding condition is as follows. After the substrate 1 and the glass plate as the upper cladding layer 10 are brought into optical contact, heat treatment is carried out at 1100° C. for 30 minutes. The above-mentioned temperature is higher than the glass transition point of the core glass material and lower than the glass transition point of $SiO_2$ as the cladding glass. As a consequence, the two glass plates as the substrate 1 and the upper cladding layer 10 are fully bonded and integrated so that no boundary is observed therebetween. The upper part of the core is brought into tight contact with the upper cladding layer 10. The core is integrally coupled with the cladding comprising the upper and the lower cladding layers surrounding the core.

As described above, the production process including a series of steps and mainly utilizing the thin-film/lithography technique is completed. On the single substrate, four arrayed waveguide gratings are simultaneously formed. In order to obtain a device which can be used as a component, each arrayed waveguide grating circuit is separated from the substrate. Then, each of the input waveguide 2 and the output waveguides 6 is connected to a fiber. A signal is inputted and outputted by the use of the fibers. When the fibers are mounted, the device is completed.

The arrayed waveguide grating apparatus produced as mentioned above is operable in a wavelength band of 1.55 $\mu$m. The channel spacing is 1.6 nm (200 GHz grid) and the number of channels is equal to 1×8. Next, in order to examine the temperature characteristic, a wavelength variable laser is connected to one input port and a signal beam emitted from a particular output port is measured. After the whole device is put into an environment tester capable of exactly controlling the temperature and the humidity, the temperature is elevated stepwise. When sufficient thermal equilibrium is achieved, the wavelength of the output signal beam is measured. In case where the temperature is elevated from 0° C. to 85° C., the total variation of the center wavelength of the arrayed waveguide grating apparatus in this embodiment is equal to 0.05 nm.

According to the reported data, the variation of the center wavelength in the arrayed waveguide grating apparatus of the existing structure is equal to 0.012 nm/° C. The variation over the temperature elevation from 0° C. to 85° C. is assumed to be equal to 1.02 nm. As compared with a channel spacing of 1.6 nm, the temperature-dependent variation of the center wavelength in the existing device brings about a large loss so that practical use is difficult.

In recent years, following the increase in communication capacity, the channel spacing tends to be narrower. At present, the channel spacing of 0.8 nm (100 GHz grid) is becoming a major trend. In this case also, selection of the material and production of the arrayed waveguide grating can be carried out in the manner similar to the arrayed waveguide grating having a channel spacing of 1.6 nm. The narrower channel spacing results in a more and more strict requirement upon the temperature-dependent variation of the center wavelength. In case of the spacing of 0.8 nm, it is required for the device that the variation of the center wavelength over the range from 0 to 85° C. is not greater than about 50 pm. In this respect also, the optical waveguide apparatus of this invention suppressed in temperature dependence is useful.

As described above, according to this invention, the core and the cladding are integrally coupled in a manner such that temperature-dependent expansion or contraction is performed substantially in accordance with the characteristic of the cladding. The materials of the core and the cladding are selected so that the variation in optical path length according to the temperature-dependent expansion or contraction of the cladding is canceled by the variation in optical path length according to the temperature-dependent variation in refractive index of the core. Thus, it is possible to obtain the optical waveguide apparatus which is practically free from temperature-dependent variation in optical path length, small in optical transmission loss, small in size, and low in cost as well as the method of producing the same.

What is claimed is:

1. A method of producing an optical waveguide apparatus, comprising the steps of:

forming a recessed portion having a predetermined pattern on a surface of a substrate;

forming a core in the recessed portion of said substrate by the use of a material having a refractive index higher than that of said substrate, a temperature coefficient of refractive index which has a value reverse in plus/minus sign to a coefficient of thermal expansion of said substrate, and a glass transition point lower than that of said substrate; and heat-treating said substrate with said core formed in said recessed portion at a temperature higher than the glass transition point of the material of said core formed in said recessed portion of said substrate and lower than the glass transition point of said substrate.

2. A method as claimed in claim 1, wherein said predetermined pattern corresponds to an optical waveguide pattern forming an arrayed waveguide grating.

3. A method as claimed in claim 1, wherein said heat treating step is carried out at a temperature higher than the glass transition point of a core glass and lower than the glass transition point of $SiO_2$ as a cladding glass.

4. A method as claimed in claim 1, wherein:
the step of forming said core is followed by the step of forming an upper cladding layer to cover an upper surface of said substrate and an upper surface of said core formed in said recessed portion of said substrate;
the step of forming said upper cladding layer being followed by the step of heat-treating said substrate.

5. A method as claimed in claim 4, wherein said substrate and a glass plate to become said upper cladding layer are put into optical contact at normal temperature and then heat treated at a temperature higher than the glass transition point of the core material and lower than the glass transition point of the cladding material.

* * * * *